Patented Dec. 5, 1933

1,938,033

UNITED STATES PATENT OFFICE 1,938,033

NEW CELLULOSE COMPOUNDS AND PROCESS FOR MAKING SAME

Leon Lilienfeld, Vienna, Austria

No Drawing. Application March 7, 1931, Serial No. 521,028, and in Great Britain March 15, 1930

4 Claims. (Cl. 260—100)

I have discovered that valuable cellulose compounds are obtained by acting on cellulose in presence of a caustic alkali with one or more alkyl isothiocyanates.

Some of the new derivatives of cellulose are soluble in aqueous alkalies, but insoluble or only sparingly soluble in water, and are insoluble in the ordinary organic solvents such as alcohol, acetone, glacial acetic acid, benzene, chloroform, ether and the like. They may be precipitated from their solutions in alkalies by means of a suitable precipitating agent such as an acid, a salt, an acid and a salt, an alcohol, acetone and the like. If their solutions or pastes be brought into the form of artificial materials, such as threads, films, plates or the like and treated with a suitable precipitating agent, either immediately or after previously drying they solidify to transparent articles, which after having been washed and dried, are lustrous, transparent and flexible.

Some of the new derivatives are insoluble or sparingly soluble in alkali solution.

The solutions in alkali of the alkali soluble representatives of the new derivatives of cellulose may be worked up into a large number of artificial materials. As examples of such products there may be mentioned: Artificial threads, films, plates, plastic compositions, coatings and layers of all kinds, textile finishing compositions which are insoluble in water, preparations for sizing yarns, thickening agents for textile printing, fixing agents for pigments, binding agents, book-cloth and the like.

The conversion of the alkali soluble representatives of the cellulose derivatives prepared according to the present invention into artificial materials, for example artificial threads, films, coatings of any kind and the like, is effected, for example, by bringing a solution of one or more alkali soluble representatives of the cellulose derivatives made in accordance with the invention, into the form of an artificial material and acting upon the thus shaped solution with a coagulating agent, for example a coagulating bath known in the viscose art. The alkali soluble representatives of the cellulose derivatives produced according to the present invention may be transformed into artificial materials also in such a manner that their shaped solutions are contacted with an agent or agents, which has or have a coagulating effect on the shaped solution and a plasticizing effect on the freshly coagulated material. As agents capable of both coagulating and plasticizing, baths containing at least 35 per cent. of sulphuric acid monohydrate (for example 50 to about 80 per cent. of sulphuric acid monohydrate) or an equivalent amount of another mineral acid, have proved suitable. The coagulating and plasticizing of the shaped solution may also occur in two steps by acting upon the shaped solution first with one or more agents which have a coagulating effect on the shaped solution and then with one or more agents (for example strong mineral acids, especially strong sulphuric acid) which have a plasticizing effect on the freshly coagulated material.

According to their mode of formation and chemical behaviour, the new cellulose compounds appear to be alkylthiourethanes of cellulose.

While the products of the reaction underlying the present invention are spoken of as alkylthiourethanes of cellulose it is not desired to limit this invention to any set chemical formulas or definitions since, while the products are probably compounds or derivatives of the types mentioned, the final composition of the products is not definitely known.

In carrying out the process bleached or unbleached cellulose or a material containing cellulose, or a conversion product of cellulose (such as a cellulose hydrate or a hydrocellulose or oxycellulose) is treated with one or more alkylisothiocyanates in presence of alkali.

The conversion occurs even without extraneous supply of heat. It is obvious, however, that, if desired, the process may also be carried out by warming or heating the alkali cellulose prior to, or during or after the addition of the alkylthioisocyanate.

The alkali may be added either by impregnating the cellulose with an excess of an aqueous or alcoholic solution of the alkali, and removing the excess of the alkali solution by pressing, centrifuging or the like, or by mixing or kneading the cellulose with the required quantity of an aqueous or alcoholic solution of the alkali.

The treatment of the cellulose with alkali and with the alkylisothiocyanate may be carried out simultaneously, or successively in either order.

The alkylisothiocyanates are added to the alkali cellulose either in an undiluted state or diluted with a suitable diluent (such as ether, alcohol or the like).

The process may also be conducted in presence of a catalyst, such as a small quantity of a copper salt or a nickel salt or an iron salt or the like.

In order to work up the reaction mixture after the reaction is completed the reaction mixture is either dissolved as such by the addition of water (when unused alkali is present in sufficient quantity), or of a solution of caustic alkali, and is put to the technical use required, if necessary, after previously filtering, straining through cloth or centrifuging, or the final product is isolated, for example by merely washing the reaction mass with water or other solvent for alkalies and salts (for instance, aqueous alcohol). The washing may also be preceded by neutralization of the alkali present in the reaction mixture, or by an acidification of the mixture particularly when there is present in the mixture a large excess of alkali which would bring the final product into solution on addition of water. The washed alkyl-thiourethanes of cellulose may then either be dissolved in an alkali or be dried. The isolation of the product may also be carried out in the following manner: The reaction mixture is dissolved by the addition of either an alkali solution or water (if enough alkali is present to dissolve the reaction product), the solution is freed, if necessary, from insoluble constituents by filtering, straining, centrifuging or the like, and then mixed with an acid, an acid salt, or any other substance capable of neutralizing the alkali, such as an ammonium salt, in quantity sufficient to neutralize the alkali, or in excess of this quantity, and the precipitate is thoroughly washed and, if desired, dried. The drying may also be preceded by a dehydration with alcohol. The compounds isolated by any method may be purified by dissolving in a dilute solution of an alkali and precipitating by means of an acid or the like.

It is impossible to indicate every condition for success in every particular case, and it is to be understood that preliminary experiments cannot be avoided to find what are the conditions necessary for success when using a particular cellulose and/or a particular alkylisothiocyanate.

The following examples of operation serve as a practical illustration of the invention, which, however, is in no way limited to the examples; the parts are by weight.

*Example 1*

100 parts of wood-pulp (water content 8 per cent.) or cotton linters (water content 6 to 7 per cent.) are introduced into 2000 parts of caustic soda solution of 30 per cent. strength at a temperature of 15° C. and left therein for 24 hours. The alkali cellulose is then pressed until it weighs 350 to 400 parts; it is shredded at a temperature of 11 to 15° C., for 2½ to 3 hours, whereupon the shredded alkali cellulose is allowed to mature for 24 to 48 hours at 20° C. After that time the alkali cellulose is placed in a kneading machine or shredder, 100 parts of methylisothiocyanate are added and the reacting mixture kneaded for 3 hours. The reaction mixture is now transferred to a vessel provided with a lid and allowed to stand at room temperature for 24 to 48 hours. After that time the reaction mixture is dissolved in 6000 to 12000 parts of caustic soda solution of 5 to 8 per cent. strength, the insoluble material is removed by filtering, straining, centrifuging or the like, and the solution treated with a dilute acid, for instance, sulphuric acid or acetic acid of 12 to 20 per cent. strength, until the product of the reaction has been completely precipitated.

The substance which separates in flakes or lumps is then separated from the mother liquor by means of a filtering device (such as a filter press, strainer, filter or the like), washed with water until free from acid or salt and dried at atmospheric or reduced pressure, if necessary after previously dehydrating it with alcohol and washing with ether. After grinding, it forms a powder, insoluble in water and in organic solvents, but soluble in dilute alkali, for instance a caustic soda solution of 5 to 8 per cent. strength. A solution of the substance in caustic soda solution (for instance, of 5 to 10 per cent. strength) is clear and viscous, and, when spread on a glass plate and treated with a dilute acid or with any precipitating agent known in the viscose industry, yields a clear film which, after washing and drying, is transparent and flexible.

*Example 2*

The process is conducted as in Example 1, but with the difference that instead of a caustic solution of 30 per cent. strength, a caustic soda solution of 18 per cent. strength is used.

*Example 3*

Mode of procedure as in Example 1 or 2, but with the difference that, instead of 100 parts, 50 parts of methyl-isothiocyanate are used.

*Example 4*

The process is conducted as in any one of the preceding examples, but with the difference that the methyl-isothiocyanate is added to the alkali cellulose immediately after the shredding step.

In the foregoing examples, instead of methyl-isothiocyanate, an equivalent amount of a homologue, for instance ethylisothiocyanate or allyl-isothiocyanate may be used.

Instead of bleached or unbleached cellulose a conversion product of cellulose which is insoluble in alkalies may be used as the parent material (for instance a cellulose which has been hydrated or hydrolyzed by chemical action such as by mercerization with subsequent washing and if necessary drying; by the action of a strong mineral acid; by heating with a weak mineral acid; or by treatment with a zinc halide; or by a mechanical process such as grinding in the presence of water, or the like; or an oxycellulose which is insoluble in alkalies); in short, any body of the cellulose group which has been proposed for the manufacture of viscose or ammoniacal-copper-oxide-cellulose.

In the specification and claims, wherever the context permits, the expression "cellulose" includes the above-mentioned compounds of the cellulose group.

*Example 5*

100 parts of a methyl-thiourethane of cellulose, prepared according to any one of the preceding examples, are dissolved in 900 to 1200 parts of a solution of caustic soda of 5 to 8 per cent. strength, whilst stirring, kneading, or the like. This solution, after filtering if necessary, is distributed in the shape of a layer by means of a suitable hopper and coagulated by any precipitating bath known in the viscose art, for example one composed of sulphuric acid, a salt and an organic substance such as sugar. The solidified film is thoroughly washed with water and dried. The continuous film may be treated before or after drying with an aqueous solution of glycerine (for instance of 10 per cent. strength), in order to increase its flexibility.

*Example 6*

A solution prepared as in Example 5 is forced or allowed to flow through a fine orifice into a precipitating bath as referred to in Example 1 and the solidified thread which forms is thoroughly washed with water and dried. The artificial thread may be treated either in the course of its manufacture or when completed with a hardening agent such as formaldehyde or the like.

Example 7

A mixture of 50 parts of viscose (prepared in the usual manner and containing 8 to 10 per cent. by weight of cellulose) and 50 parts of a solution of a methylthiourethane of cellulose, prepared as in Example 5 is spun into artificial thread as described in Example 6.

Example 8

Mode of procedure as in Example 6 or 7, but with the difference that sulphuric acid of 30–70 per cent. strength is used as coagulating bath and the spinning is performed in a manner similar to the methods described in my U. S. Patent Nos. 1,613,199 and 1,613,200 and in my British specification No. 274,690.

Example 9

A woven fabric, such as a cotton fabric, is provided by means of a suitable machine, such as a backfilling machine or a padding machine or a spreading machine, with one or more coatings of a solution, prepared as in Example 5 or Example 7, and is then dried. (When more than one coating is applied it is desirable to dry the material after the application of each coating.) After the material has been dried and if desired steamed for a short time, it is introduced into a precipitating bath as referred to in Example 5 or 8 and is then washed and dried. The textile material may be treated before or after drying with a softening agent, such as a soap solution, an aqueous solution of Turkey-red oil, or an aqueous solution of glycerine.

Example 10

The procedure is as in Example 9, with the exception that there is added to the solution a filling material, for instance, zinc-white, china-clay or talc.

Example 11

The procedure is as in Example 10 or 9, with the exception that there is added to the solution a softening agent, such as a drying or non-drying oil, or a soap.

Example 12

The procedure is as in Example 9, 10 or 11, with the exception that the solution is mixed with a solution of starch.

After it is finished, the dressed or coated textile material may be pressed or calendered, or provided with a pattern, or embossed by treatment with riffled or engraved rollers.

Example 13

100 parts of a solution prepared as in Example 5 are mixed with 6 to 10 parts of finely ground mica, or with 4 parts of lamp black, or with 8 to 10 parts of zinc-white and printed by means of suitable printing rollers on cotton fabric, if necessary after previously grinding in a colour-grinding mill. The printed and dried fabric is then treated in a precipitating bath as referred to in Example 6, optionally after previously steaming, and is then washed and dried.

The expression "artificial material" used in the specification and claims includes: artificial threads, particularly artificial silk; films; coatings and layers of every kind; dressings for textiles, paper leather and the like; sizing for yarns; book-cloth; artificial leather; adhesives and cements; plates and plastic compositions in general; thickening agents or fixing agents for pigments in textile printing and the like.

The term "artificial threads" denotes artificial threads and spun goods of all kinds, for instance artificial silk, staple fibre, artificial cotton, artificial wool, artificial hair, and artificial straw of any kind.

The expression "strong mineral acids" denotes sulphuric acid of at least 35 per cent. of $H_2SO_4$, preferably at least 45 per cent. of $H_2SO_4$, and as regards the other mineral acids, solution of equivalent strength.

The expression "strong sulphuric acid" or "sulphuric acid containing at least about 35 per cent. of sulphuric acid monohydrate" denotes sulphuric acid having a content of 35 to 98 per cent. of $H_2SO_4$.

What I claim is:

1. Process for the manufacture of new cellulose derivatives which are suitable for the manufacture of artificial materials, which process comprises acting upon cellulose in presence of alkali with an alkylisothiocyanate.

2. A process of making alkali soluble cellulose thiourethane suitable for the manufacture of artificial materials, which comprises reacting upon alkali cellulose with an alkyl isothiocyanate.

3. A process of making alkali soluble cellulose thiourethane suitable for the manufacture of artificial materials, which comprises reacting upon alkali cellulose in a moist state with an alkyl isothiocyanate and dissolving the alkylurethane product in an alkaline solution.

4. A mixture of viscose with an alkaline solution of the reaction product of alkali cellulose and an alkyl isothiocyanate.

LEON LILIENFELD.